(12) United States Patent
Chang et al.

(10) Patent No.: US 8,148,833 B2
(45) Date of Patent: Apr. 3, 2012

(54) ON-ROAD ENERGY CONVERSION AND VIBRATION ABSORBER APPARATUS

(76) Inventors: Hung-Wei Chang, New Taipei (TW); Chih-Yang Lee, New Taipei (TW)

( * ) Notice: Subject to any disclaimer, the term of this patent is extended or adjusted under 35 U.S.C. 154(b) by 0 days.

(21) Appl. No.: 13/110,059

(22) Filed: May 18, 2011

(65) Prior Publication Data
US 2011/0215593 A1 Sep. 8, 2011

Related U.S. Application Data

(63) Continuation-in-part of application No. 12/234,624, filed on Sep. 20, 2008, now abandoned.

(51) Int. Cl.
*F02B 63/04* (2006.01)
(52) U.S. Cl. ........................................... 290/1 R
(58) Field of Classification Search .................. 290/1 R; 180/165, 166, 65.31, 2.1; 60/698, 671, 325, 60/398
See application file for complete search history.

(56) References Cited

U.S. PATENT DOCUMENTS
7,239,031 B2 * 7/2007 Ricketts ........................ 290/1 R
* cited by examiner

*Primary Examiner* — Tho D Ta
(74) *Attorney, Agent, or Firm* — Chuh-Ming Shih

(57) ABSTRACT

An on-road energy conversion and vibration absorber apparatus receives the kinetic energy from moving vehicles and pedestrians when being weighed down, and converts the received kinetic energy into a potential energy using a restorable elastic element compressing a fluid thereby storing the potential energy in a pressure chamber, and then conducting the pressurized fluid to pass though a check valve along a conduit and drive a vane wheel by releasing its potential energy. The vane wheel in turn drives a generator to generate electric energy, and the vibration of the vehicles is alleviated by cushion effect provided by the apparatus.

12 Claims, 17 Drawing Sheets

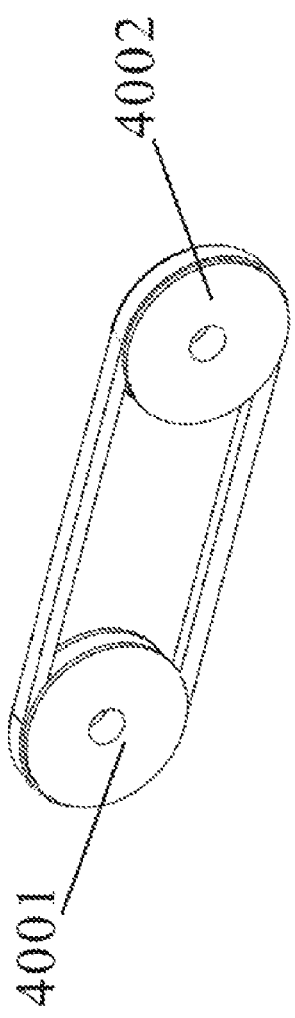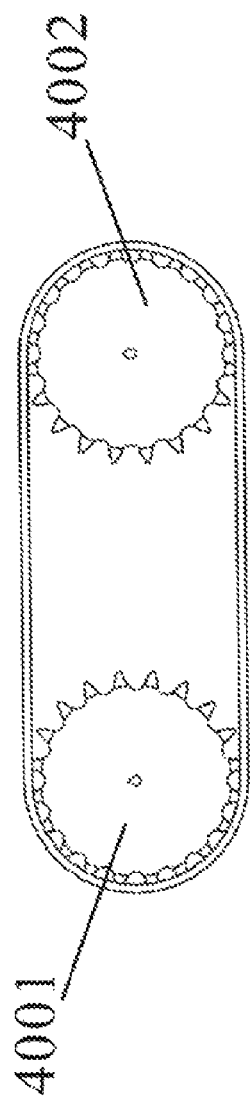
FIG. 17(a)
FIG. 17(b)

ON-ROAD ENERGY CONVERSION AND VIBRATION ABSORBER APPARATUS

CROSS-REFERENCE TO RELATED APPLICATIONS

The present application is a continuation-in-part application of U.S. patent application Ser. No. 12/234,624 filed on Sep. 20, 2008 now abandoned, which is incorporated by reference herein in its entirety.

BACKGROUND OF THE INVENTION

1. Field of the Invention

The present invention relates to an on-road energy conversion and vibration absorber apparatus in which the kinetic energy received from moving vehicles (including motorcycles and bicycles) and pedestrians are converted into a potential energy using a restorable elastic element to compress and pressurize a fluid, and then to drive a vane wheel by releasing the pressure of the pressurized fluid. The vane wheel in turn drives a generator to generate electric energy.

2. Description of the Prior Art

Continuous rising of the oil cost has been affecting the economy in the whole world that the problems of environmental protection, energy saving, carbon reduction and anti-global green house effect have drawn more attention of the people than ever. At the same time, the development of new and non-contamination energy source is a paramount importance in the present day.

As it is well-known, the traditional steam power plant produces a large amount of carbon dioxide which aggravates the green house effect, the hydraulic power plant is destructive to natural environment in construction and power supply is not reliable during low water periods, and the nuclear power plant is said to be the most threatful to the security. The wind power and solar light are considered to be the new hope of two clean energy sources. However, the both are sometimes geographically restrictive by reason of local climate.

The inventor of the present invention who has a great interest in development of new energy sources has paid attention to the fact that there are so much energy wasted by the vehicles using inefficient engines which produce a large amount of exhaust gases containing harmful ingredients and heat dissipated along the roads to cause environmental pollution. How nice should it be possible to restore such wasted energies for reuse!

In a bid to tackle this problem, the present inventor has dedicated great efforts for years to studying and improving these defects and has come up with the on-road energy conversion and vibration absorber apparatus as provided in this invention that can be used to restore part of the vehicle even pedestrian's lost of energies on the road for reuse.

SUMMARY OF THE INVENTION

It is an object of the present invention to provide an on-load energy conversion and vibration absorber apparatus in which the kinetic energy received from moving vehicles (including motorcycles and bicycles) and pedestrians are able to be converted into a potential energy using a restorable elastic element to compress and pressurize a fluid, and then to drive a vane wheel by releasing the pressure of the pressurized fluid. The vane wheel in turn drives a generator to generate electric energy.

It is another object of the present invention to provide an on-load energy conversion and vibration absorber apparatus that in addition to performing the energy conversion, the vibration of vehicles can also be absorbed and alleviated.

To achieve the above objects, the aforesaid apparatus comprises a restorable elastic compression unit to be laid on the road surface with a pressure receiver plate attached to the top thereof, and a pressure chamber is formed inside. The pressure receiver plate is for receiving the weights of those moving vehicles including motorcycles and bicycles and pedestrians weighing down thereon so as to compress and pressurize a fluid, mainly air, contained in the pressure chamber. An elastic compression unit is provided to support the pressure receiver plate and restore it to its initial position after the exerting weight is released. A fluid conduit with a check valve is installed abut on, and in connection with the pressure chamber, the check valve conducts the pressurized fluid to flow along the conduit in one direction and drives a vane wheel with a jet flow of the pressurized fluid by releasing it potential energy. The vane wheel in turn drives a generator to generate electric energy. And the vibration of the vehicles is alleviated by the cushion effect of the restorable elastic element.

Meanwhile, the pressure receiver plate has a structure of a large square plate whose surface contains a number of small square grid shaped meshes, or patterned in a beehive configuration.

The present invention provides an energy generating system, at least comprising: (1) at least one object holder, wherein the object holder comprises at least one pressure-transferring device, wherein the pressure-transferring device at least comprises a fluid tube, an outlet non-return valve, and an inlet non-return valve, wherein the outlet non-return valve and inlet non-return valve are disposed in the fluid tube; (2) at least one energy transformer, wherein the energy transformer comprises a fluid machinery, an electrical power generator, and a mechanism, wherein the fluid machinery transfers energy to the electrical power generator through the mechanism, wherein the fluid machinery comprises a fluid inlet and a fluid outlet; (3) at least one fluid storage; (4) at least one power converter electrically connected to the electrical power generator; (5) at least one first pipeline connected to the fluid tube of the pressure-transferring device and connected to the fluid inlet of the fluid machinery, or the fluid inlets of the pressure-transferring device, energy storage, and fluid machinery; (6) at least one second pipeline connected to the fluid outlet of the fluid machinery and connected to the fluid storage; and (7) at least one third pipeline connected to the fluid storage and connected to the fluid tube of the pressure-transferring device.

Other objects of the invention will be apparent to persons acquainted with apparatus of this general type upon reading the following specification and inspection of the accompanying drawings.

DETAILED DESCRIPTION OF THE PREFERRED EMBODIMENT

Figure 1:
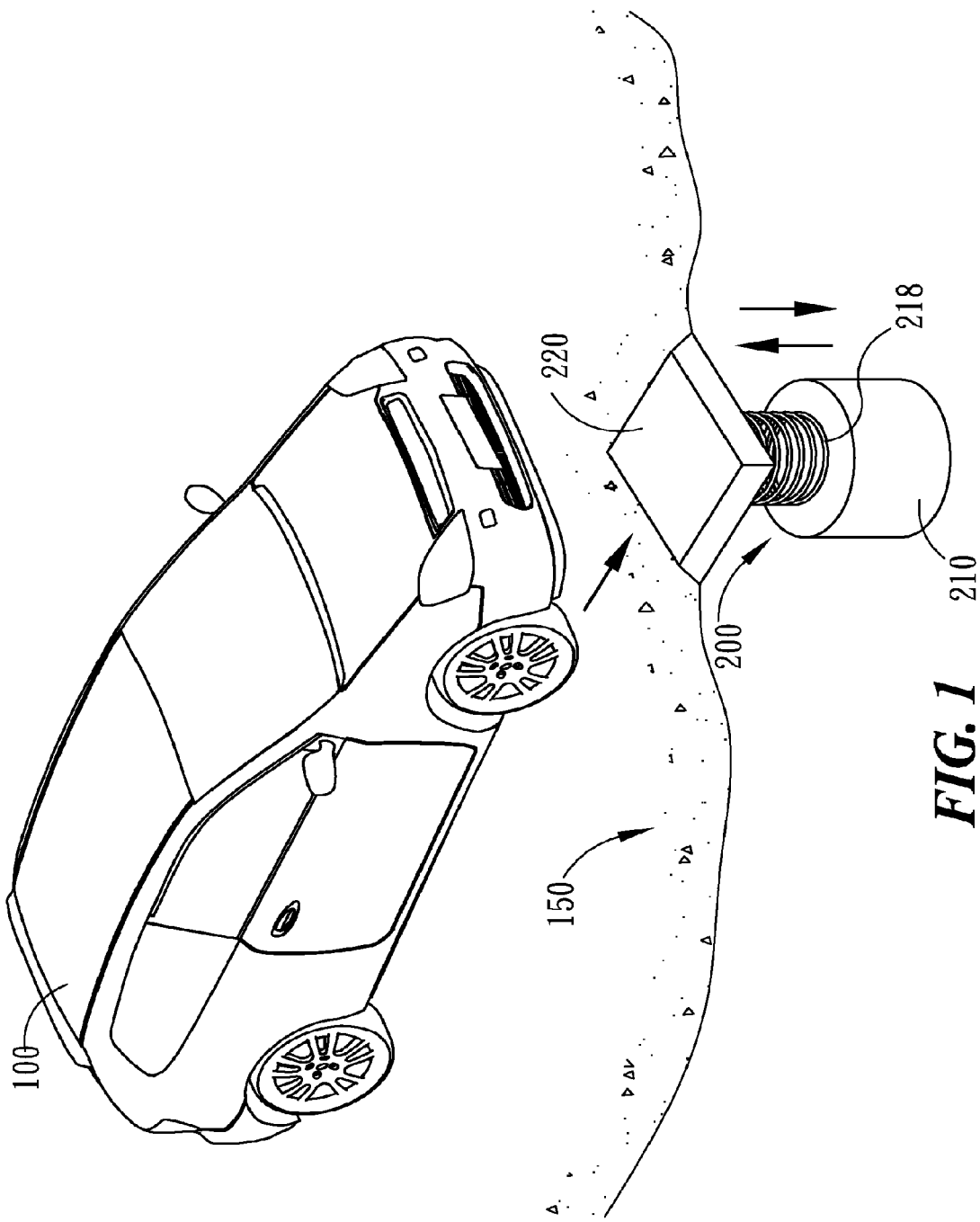
FIG. 1 is a perspective view of the present invention showing the relative position of a pressure receiver plate, restorable elastic element and pressure chamber.

Referring to FIG. 1, the on-road energy conversion and vibration absorber apparatus receives the energy (static, kinetic energy of the rolling wheel) delivered by a vehicle 100 and even pedestrians when being weighed down on a pressure chamber 210 formed in a compression unit. The fluid contained in the pressure chamber 210 is pressurized to output a kinetic energy and at the same time, alleviating the vibration of the vehicle 100. In the apparatus, a compression unit 200 is installed beneath the road surface 150. When the vehicle 100 and pedestrians weigh down on a pressure receiver plate 220 of the compression unit 200, the fluid in the pressure chamber 210 is pressurized to store the potential energy and then conducted to pass through a check valve 250 to flow in one direction, and the vibration of the vehicle is also alleviated by the cushion effect of the restoring force of the compression unit 200 performed by a restorable elastic element 218. The restorable elastic element 218 is a spring, or replaceable with the fluid in the pressure chamber 210. The fluid to be used is essentially air.

Figure 2:
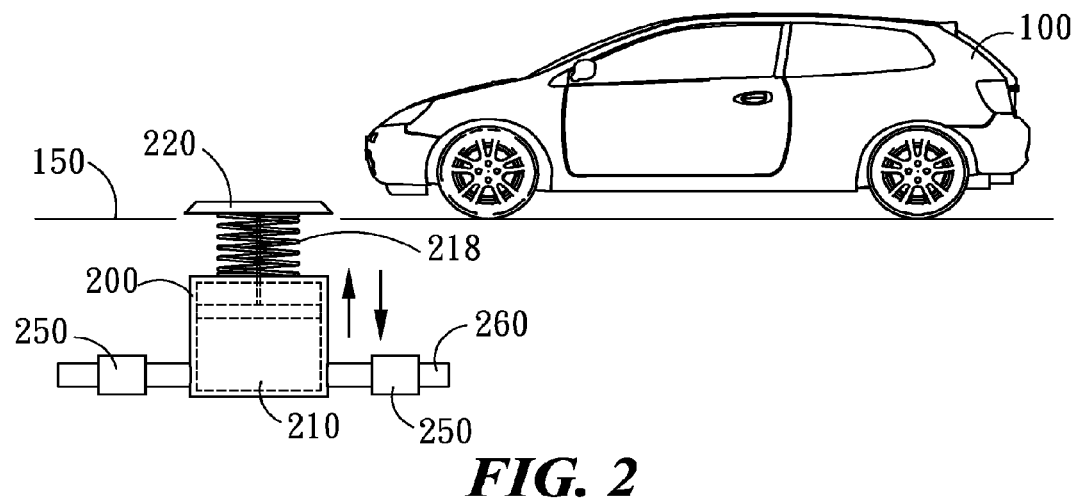
FIG. 2 is a perspective view of the present invention showing the relative position of a pressure receiver plate, restorable elastic element, pressure chamber, check valve and fluid conduit.

Referring to FIG. 2, in this embodiment, in addition to the component parts described in FIG. 1, a fluid conduit 260 is connected behind the check valve 250 to conduct the pressurized fluid to pass through in one direction along the fluid conduit 260 so as to make use of its kinetic energy.

Figure 3:
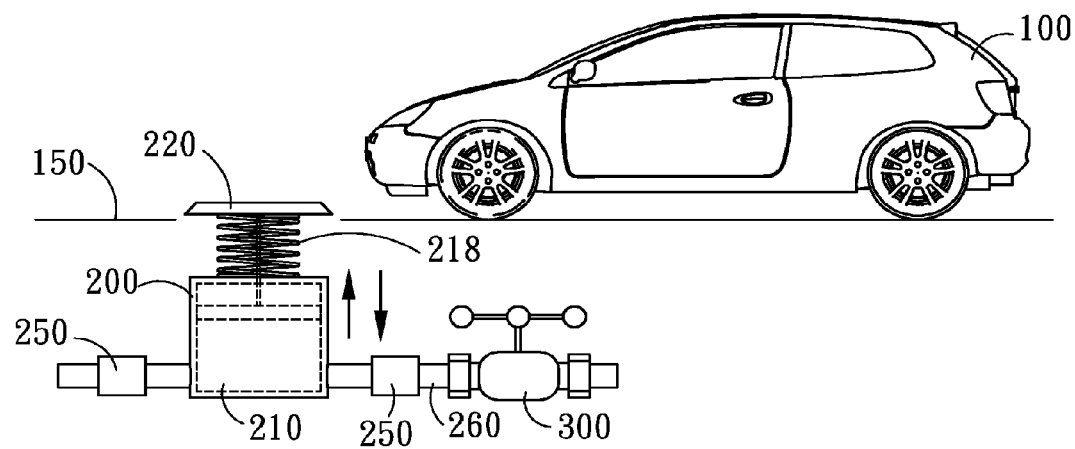
FIG. 3 is a perspective view of the present invention showing the relative position of an extra governor valve in addition to the components shown in FIG. 2.

Referring to FIG. 3, a governor valve 300 is provided to the exit of the fluid conduit 260 so as to control discharge of the fluid.

Figure 4:
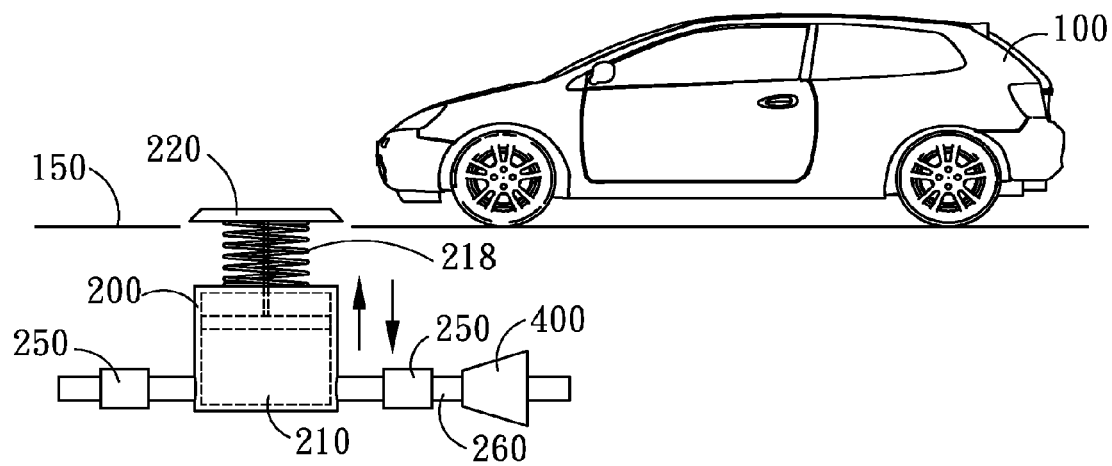
FIG. 4 is a perspective view of the present invention showing the relative position of a vane wheel in addition to the components shown in FIG. 3.

Referring to FIG. 4, the pressurized fluid discharged from the fluid conduit 260 is used to drive a vane wheel 400 (windmill, watermill) or a water spray gun by releasing its potential energy.

Figure 5:
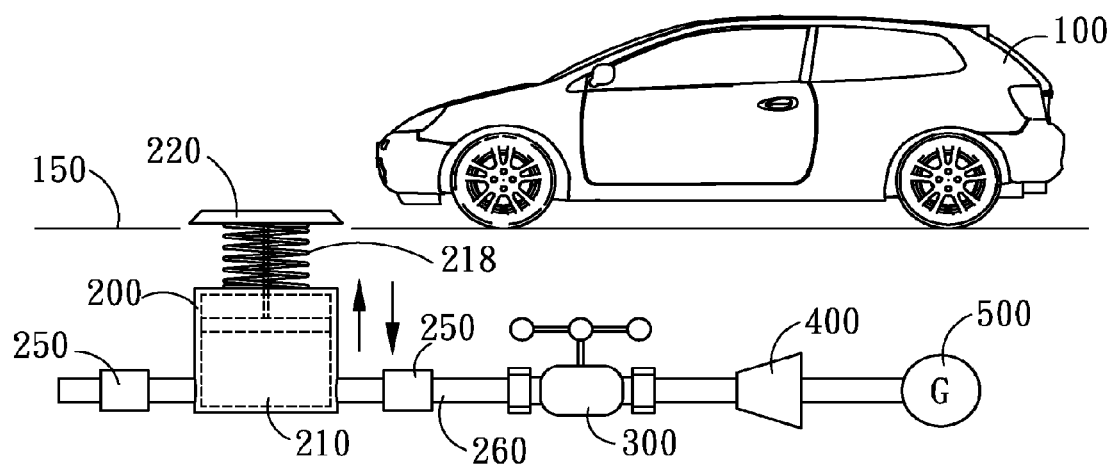
FIG. 5 is a perspective view of the present invention showing a generator is connected to the apparatus shown in FIG. 4.

Referring to FIG. 5, a generator 500 is connected to the vane wheel 400 or a water spray gun to be driven to generate electric energy.

Figure 6:
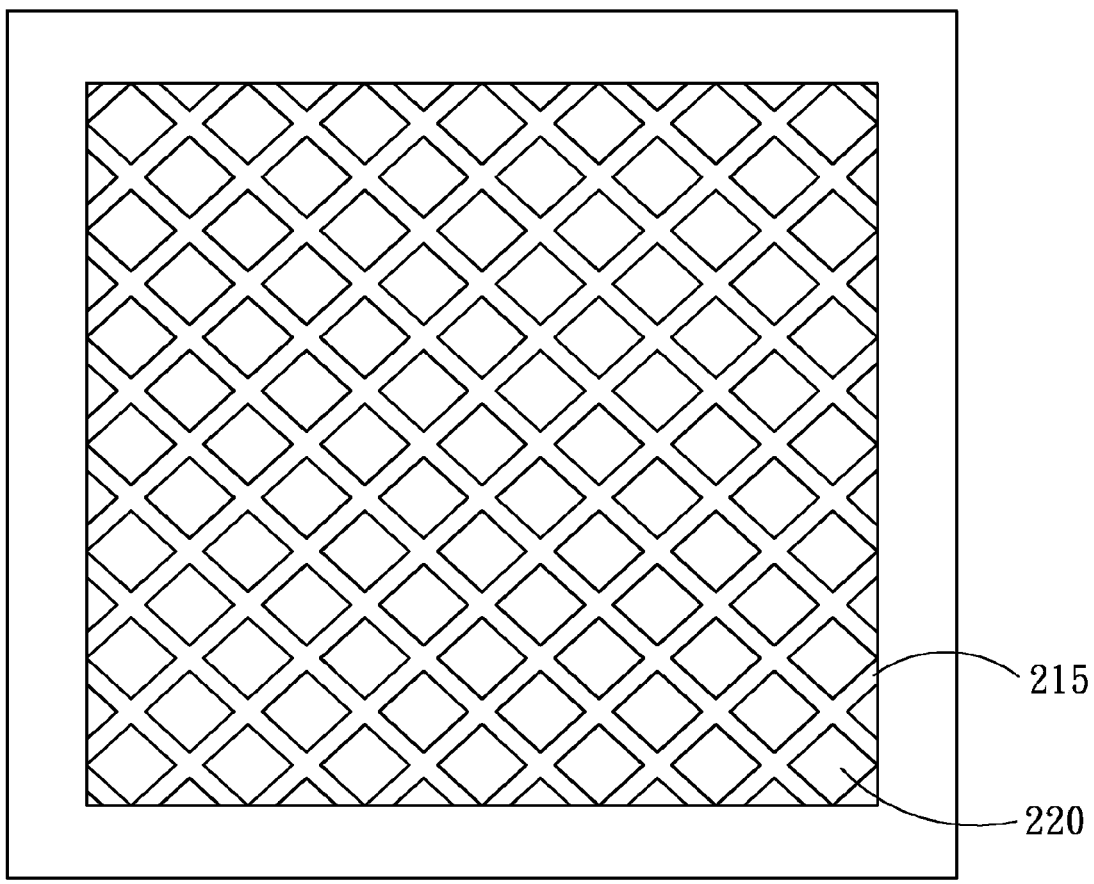
FIG. 6 is a schematic view showing the surface pattern of the pressure receiving plate.

Referring to FIG. 6, the pressure receiver plate 220 has a structure of a large square plate whose surface contains a number of small square grid shaped meshes, or is patterned in a beehive configuration 215. After being liberated from the weight of the vehicle 100 or the pedestrian, the pressure receiver plate 220 recovers its initial state with the aid of the restorable elastic element 218 and ready for successively coming vehicles 100 or pedestrians to weigh down.

The present invention further provides a large-scale operation that shares similar concepts with the embodiments disclosed above.

Figure 7:
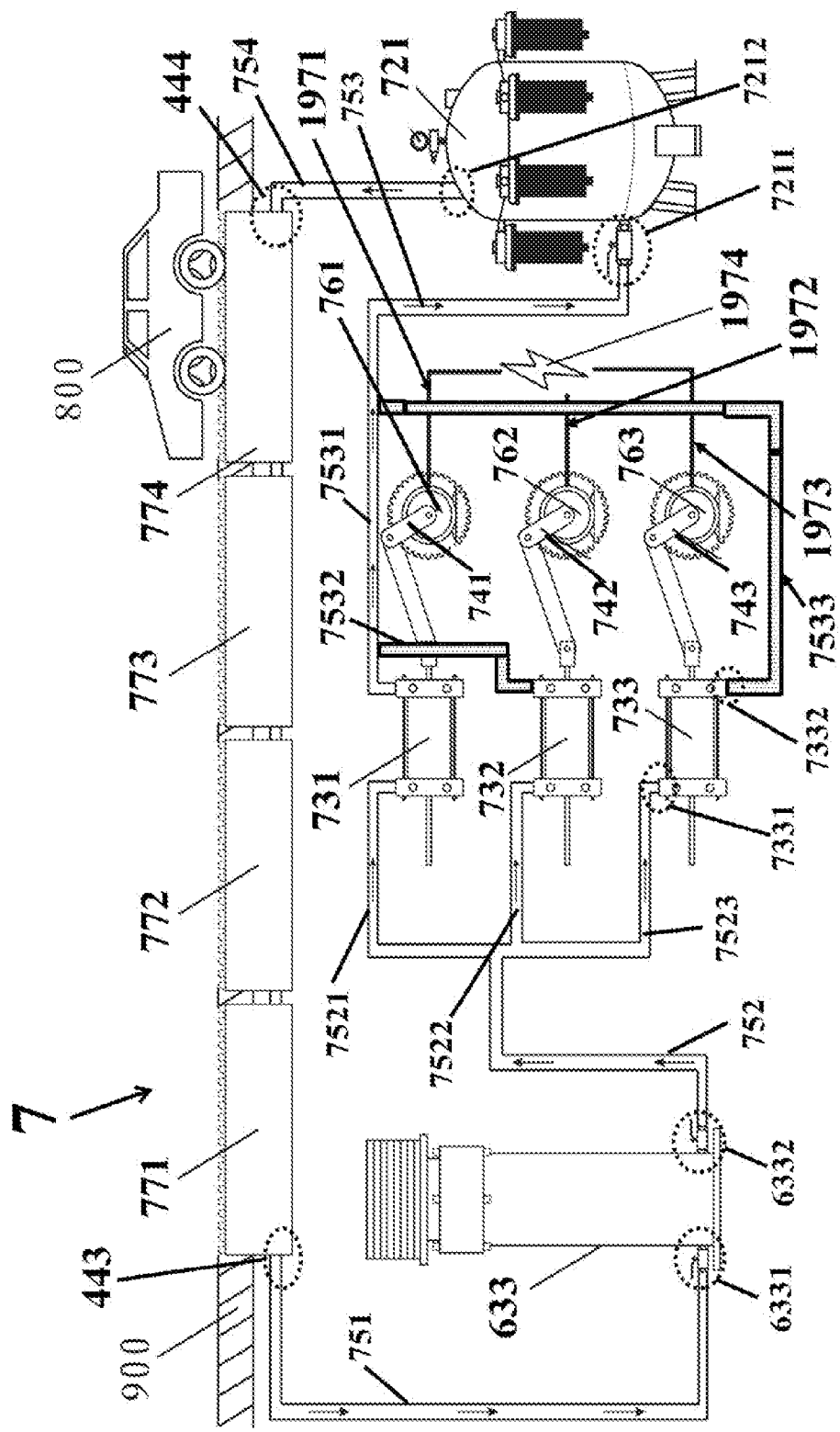
FIG. 7 shows one embodiment of an energy generating system of the present invention.

The present invention further provides an energy-generating system. As shown in FIG. 7, one embodiment of an energy generating system comprises at least one object holder 771, 772, 773, 774, at least one energy transformer 78 (shown in FIG. 8), at least one fluid storage 721, at least one power converter 1974, at least one first pipeline 751, 752, 7521, 7522, 7523, at least one second pipeline 753, 7531, 7532, 7533, at least one third pipeline 754, and at least one energy storage 633.

Figure 9:
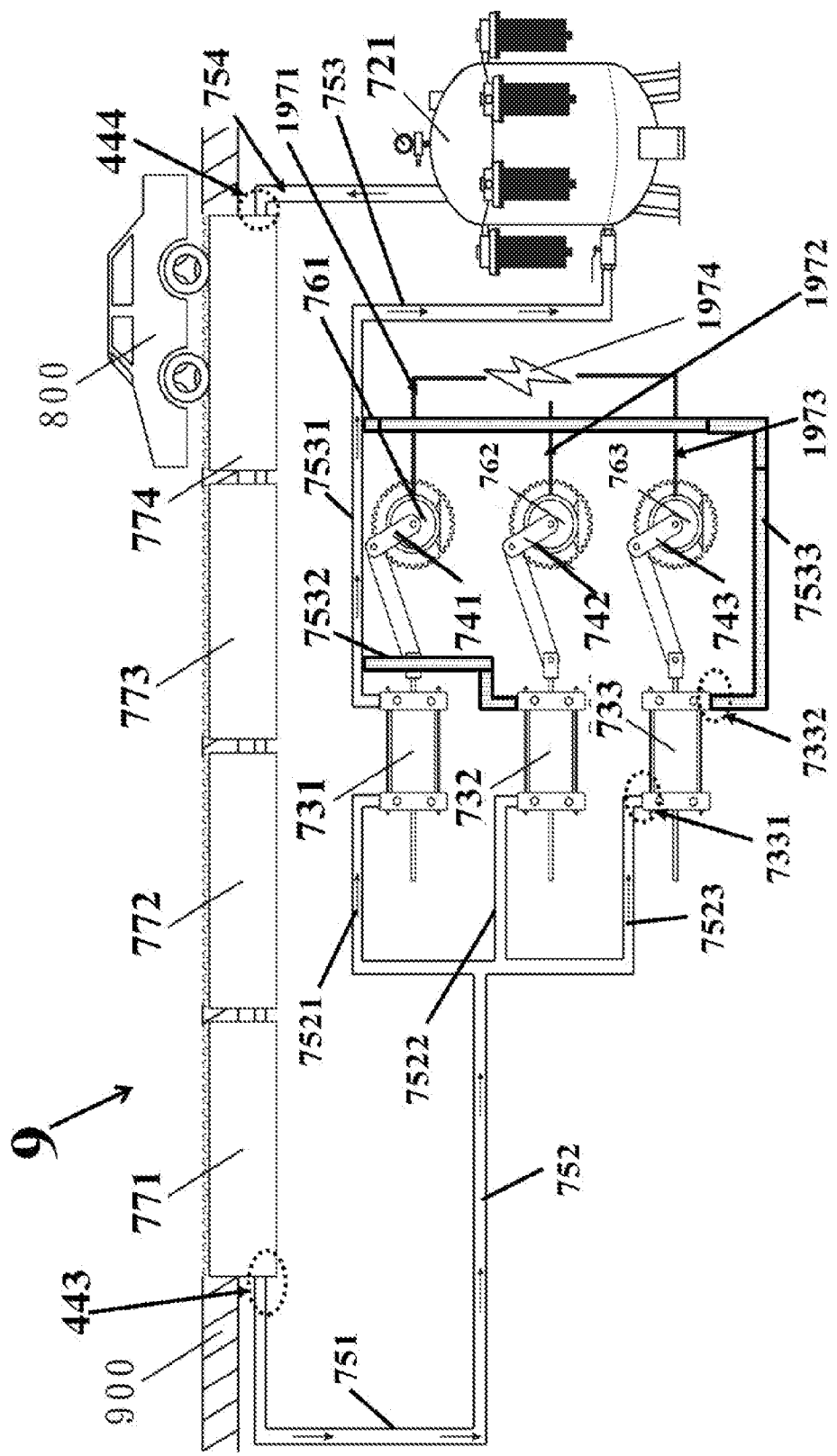
FIG. 9 shows one embodiment of an energy generating system of the present invention.

For some embodiments, as shown in FIG. 9, an energy generating system 9 of the present invention does not need an energy storage (as the element 633 in FIG. 7). For some embodiments, the energy storage 633 is not a necessary component.

Figure 8:
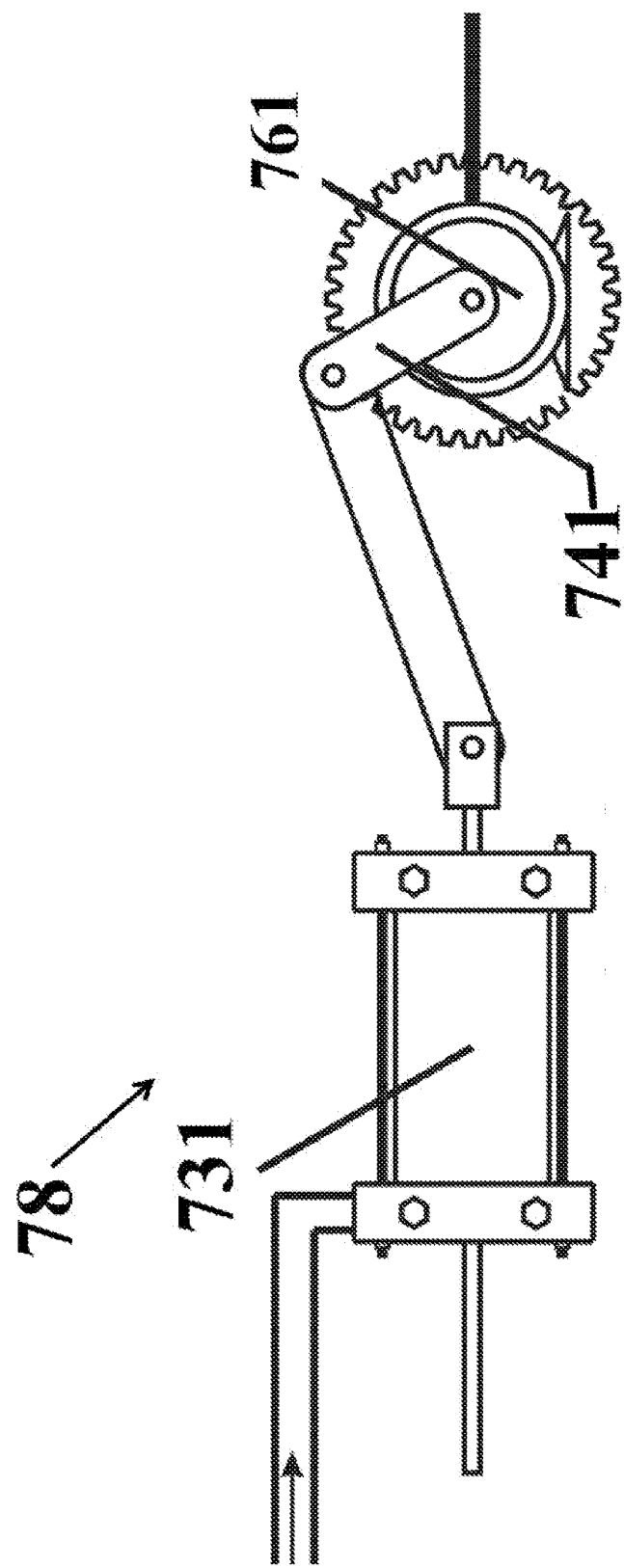
FIG. 8 shows an energy transformer used in the present invention.

As shown in FIG. 8, for some embodiments, the energy transformer 78 comprises a fluid machinery 731, an electrical power generator 761, and a mechanism 741. The fluid machinery 731 transfers energy to the electrical power generator 761 through the mechanism 741. Please refer to FIG. 7. The fluid machinery 733 comprises a fluid inlet 7331 and a fluid outlet 7332. It should be mentioned that in FIG. 7, the fluid machineries 731, 732, also have a fluid inlet and a fluid outlet.

As shown in FIG. 7, the object holders 771, 772, 773, 774 are embedded near a ground surface 900. The ground surface 900 may be a road, a street, or an entrance of any construction (e.g., a house, apartment, building, and so on). The object holder may hold an object 800 (e.g., a car).

Figure 12:
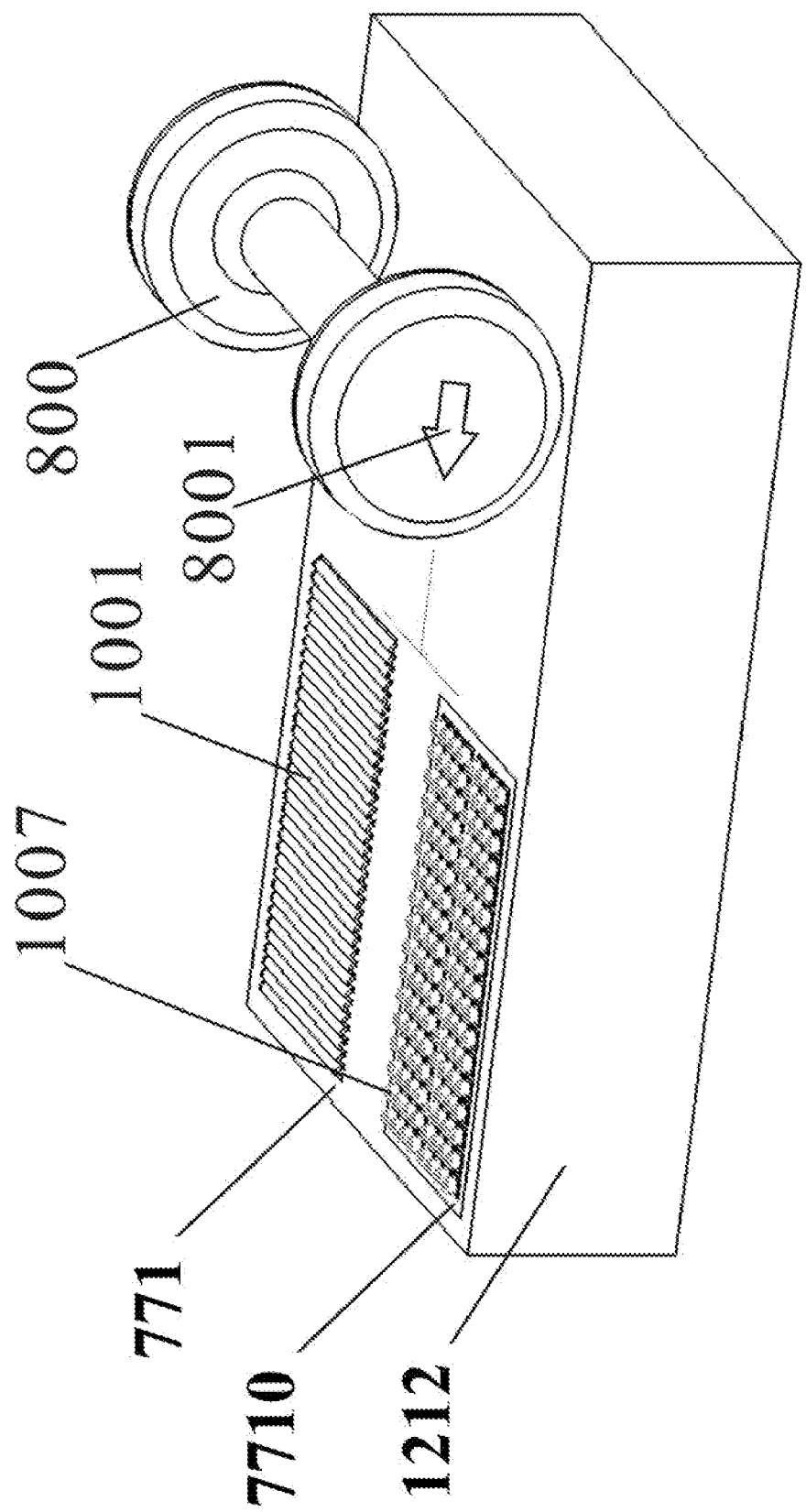
FIG. 12 shows one aspect of an object holder used in the present invention.

As shown in FIG. 12, the object holder 771, 772, 773, 774 comprises at least one pressure-transferring device 1007, 1001.

Figure 13:
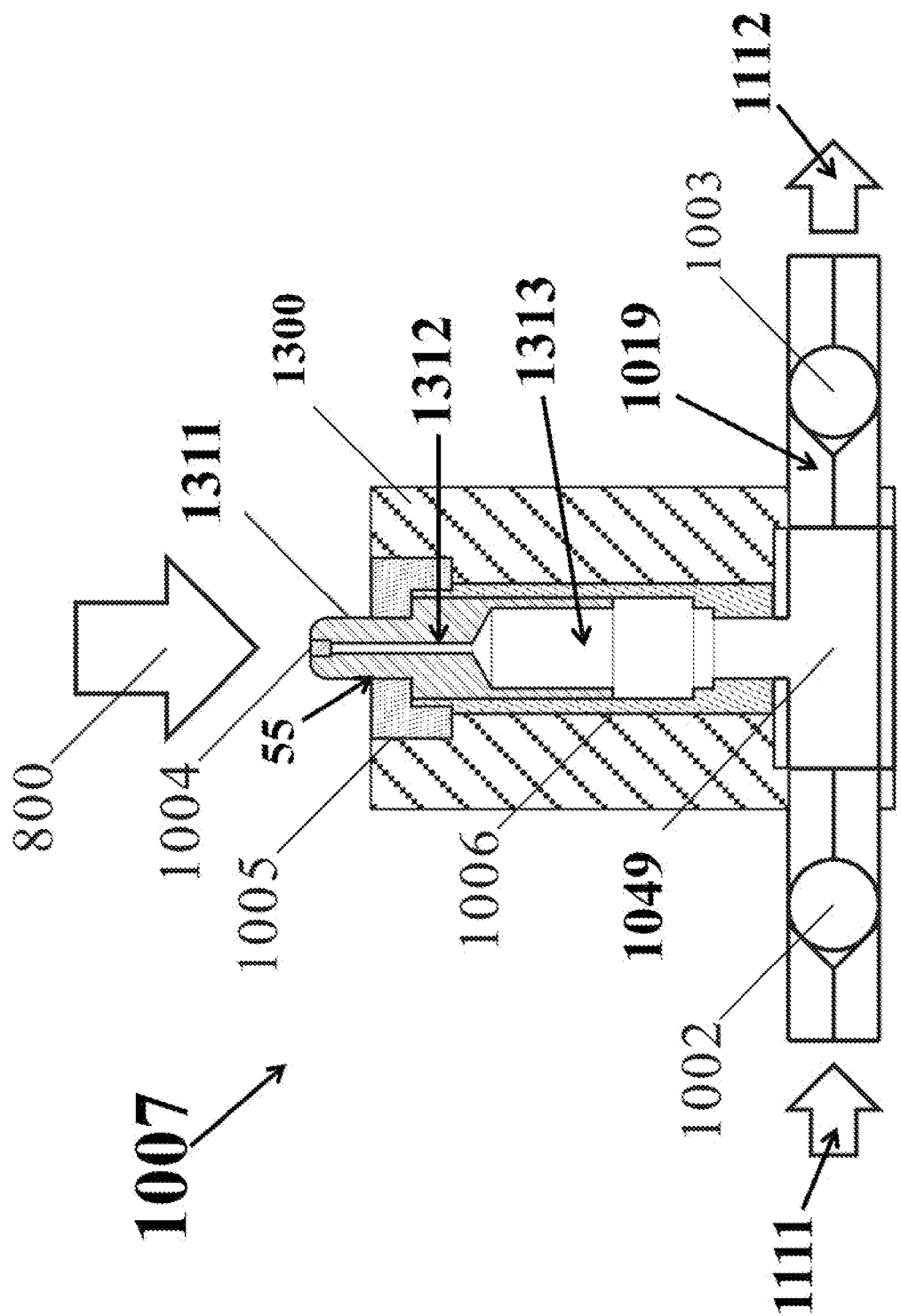
FIG. 13 shows one pressure-transferring device used in the present invention.

As shown in FIG. 13, for some embodiments, the pressure-transferring device 1007 at least comprises a fluid tube 1019, an outlet non-return valve 1003, and an inlet non-return valve 1002. The outlet non-return valve 1003 and inlet non-return valve 1002 are disposed in the fluid tube 1019.

As shown in FIG. 13, for some embodiments, the pressure-transferring device 1007 further comprises a contact member 1311, a chamber member 1300, and a pushing member 1313, 1049. The pushing member is connected to the contact member 1311 and the fluid tube 1019. Besides, the pushing member 1313 is disposed in the chamber member 1300.

Please refer to FIG. 13 again. The chamber member 1300 comprises a main body 1300, a chamber 1006, and a cap 1005. The pushing member 1313 is disposed in the chamber 1006. The cap 1005 comprises a hole 55. The contact member 1311 extends to a region that is above the hole 55. Furthermore, for some embodiments, as shown in FIG. 13, the chamber 1006 is vacuum.

It should be noted that, for some embodiments, "vacuum" occurs during the operation. That is, the chamber 1006, cap 1005, and contact member 1311 are designed to let three parts to be able to precisely fit each other in terms of dimensions. When the contact member 1311 receives the pressure, the space formed between the cap 1005 and the chamber 1006 will be a vacuum region. In such way, the force for moving the contact member 1311 to its original level can be reduced.

Please refer to FIG. 13 again. The contact member 1311 comprises a tunnel 1312 and a gas outlet member 1004. The gas outlet member 1004 is disposed in the tunnel 1312. Specifically, the gas outlet member 1004 is located at the end of the tunnel 1312. When the fluid in the fluid tube 1019 is accompanied by gas, the gas outlet member 1004 can release such gas.

The present invention also provides alternative embodiments regarding the pressure-transferring device. Please refer to FIG. 14. In some embodiments, the pressure-transferring device 1007 at least comprises a fluid tube 1019, an outlet non-return valve 1003, and an inlet non-return valve 1002. The outlet non-return valve 1003 and inlet non-return valve 1002 are disposed in the fluid tube 1019. In addition, for some embodiments, the pressure-transferring device 1007 further comprises a material 1049 covering part of the fluid tube 1019.

Please refer to FIG. 12 again. In some embodiments, the object holder 771 further comprises a cast 1212. The pressure-transferring device 1001, 1007 is exposed on a top surface 7710 of the cast 1212.

It should be noted that, for some embodiments, the object holder 771 has no cast. So, the element 1212 in FIG. 12 is expressed as a road 900 as shown in FIGS. 7 and 9-11.

Please refer to FIG. 9 again. The present invention provides one embodiment of an energy generating system which comprises at least one object holder 771, 772, 773, 774, at least one energy transformer 78 (shown in FIG. 8), at least one fluid storage 721, at least one power converter 1974, at least one first pipeline 751, 752, 7521, 7522, 7523, at least one second pipeline 753, 7531, 7532, 7533, and at least one third pipeline 754.

As shown in FIG. 9, one part 751 of the first pipeline 751, 752 is connected to the fluid tube 443 of the pressure-transferring device of one object holder 771. One part 7523 of the first pipeline 751, 752 is connected to the fluid inlet 7331 of the fluid machinery 733. In some embodiments, some parts 7521, 7522, 7523 of the first pipeline 751, 752 are connected to the fluid inlets of the fluid machineries 731, 732, 733, separately.

As shown in FIG. 9, one part 7533 of the second pipeline 753 is connected to the fluid outlet 7332 of the fluid machinery 733. One part of the second pipeline 753 is connected to the fluid storage 721. In some embodiments, some parts 7531, 7532, 7533 of the second pipeline 753 are connected to the fluid outlets of the fluid machineries 731, 732, 733, separately.

Please refer to FIG. 9 again. The third pipeline 754 is connected to the fluid storage 721. The third pipeline 754 is also connected to the fluid tube 444 of the pressure-transferring device of one object holder 774.

As shown in FIG. 9, some embodiments of an energy generating system of the present invention comprise at least one power converter 1974. The power converter 1974 is electrically connected to the electrical power generator 761, 762, 763. The power converter may transform the current generated by the electrical power generator 761, 762, 763, into A/C or D/C current.

Please refer to FIG. 7 again. For some embodiments which comprises at least one energy storage 633. The energy storage 633 is located between the object holder 771 and the fluid machinery 731, 732, 733. The energy storage 633 has a fluid input 6331 and a fluid output 6332. The fluid input 6331 of the energy storage 633 is connected to one part 751 of the first pipeline. The fluid output 6332 of the energy storage 633 is connected to one part 752 of the first pipeline.

Figure 15:
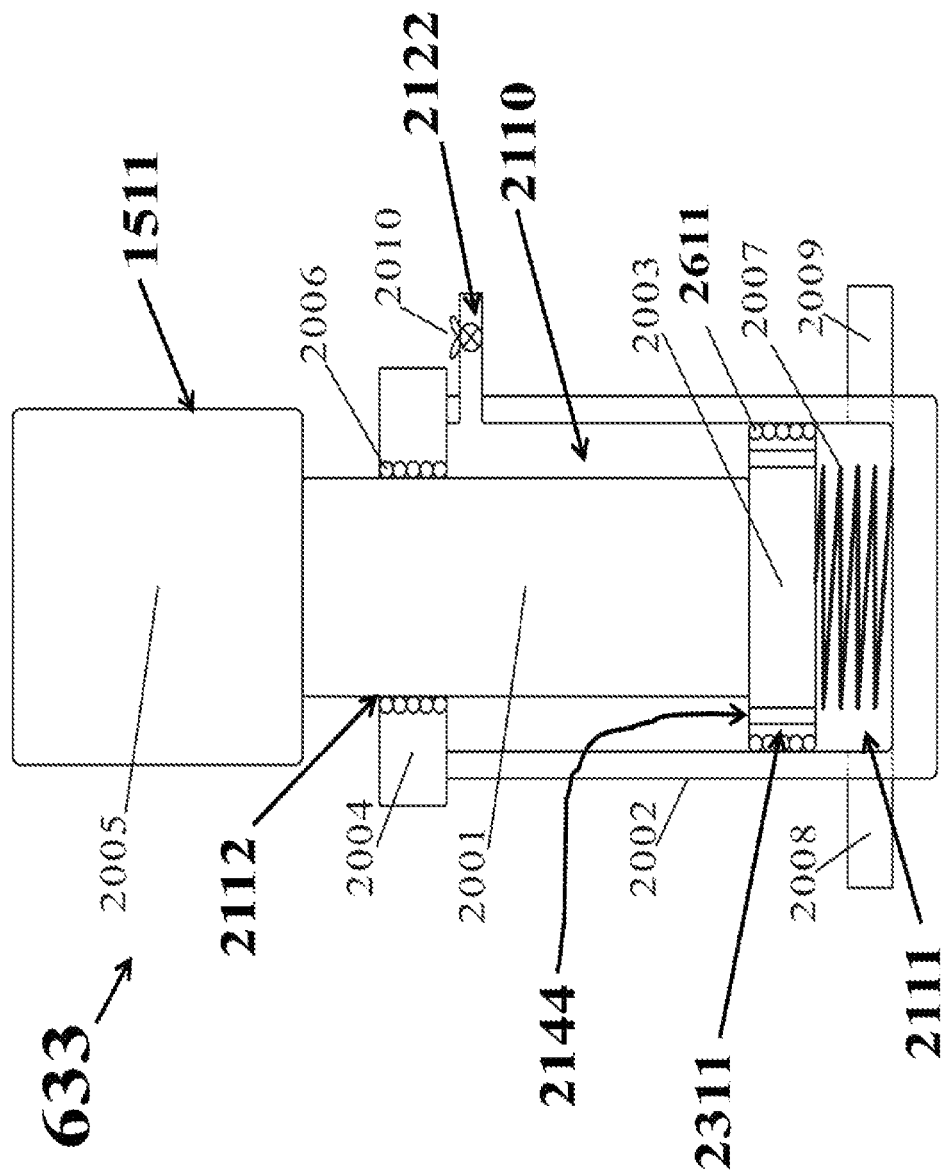
FIG. 15 shows one energy storage used in the present invention.

Please refer to FIG. 15. The energy storage 633 comprises a fluid tank 2002, a piston member 1511, and a spring member 2007.

As shown in FIG. 15, for some embodiments, the fluid tank 2002 comprises a gas region 2110, a gas region tube 2122, a fluid region 2111, and a tank cap 2004. The gas region tube 2122 comprises a gas valve 2010. The gas region tube 2122 is also attached to the gas region 2110.

As shown in FIG. 15, the tank cap 2004 covers the fluid tank 2002. For some embodiments, the tank cap 2004 comprises a cap opening 2112 and a first ball region 2006. The cap opening 2112 comprises an inner sidewall. The first ball region 2006 comprises a plurality of first balls 2006. And, the first ball region 2006 is attached to the cap opening 2112.

As shown in FIG. 15, the piston member 1511 comprises a top member 2005, a piston body member 2001, and a head member 2003. The top member 2005 is attached to the top of the piston body member 2001. The head member 2003 is attached to the bottom of the piston body member 2001.

The top member 2005 is disposed above the tank cap 2004, as shown in FIG. 15. The piston body member 2001 penetrates through the cap opening 2112, as shown in FIG. 15.

As shown in FIG. 15, the head member 2003 comprises a second ball region 2611 and a head body 2003. The second ball region 2611 comprises a plurality of second balls 2611. The head body 2003 comprises an outer sidewall 2311. The second ball region 2611 is attached to the outer sidewall 2311.

As shown in FIG. 15, for some embodiments, a portion of the piston member 1511 is disposed in the fluid tank 2002.

As shown in FIG. 15, the spring member 2007 is attached to the piston member 1511. For some embodiments, the spring member 2007 is attached to the head member 2003 of the piston member 1511. For some embodiments, the spring member 2007 is disposed in the fluid tank 2002. It should be noted that there could be more than one spring member used in the present invention. It should be noted that, for some embodiments, the spring member is not a necessary component.

As shown in FIG. 15, the fluid input 2008 and fluid output 2009 are attached to the fluid region 2111 of the fluid tank 2002.

It should be noted that, for some embodiments, as shown in FIG. 15, there are tunnels 2144 in the head body 2003 (or, head member 2003, so the fluid in the fluid region 2111 can move to the gas region 2110 through these tunnels 2144. Therefore, during the operation, for some embodiments, the gas region 2110 may contain fluid. Under such circumstance, such fluid in the gas region 2110 can reduce the backside pressure imposed on the head body 2003. Meanwhile, the gas absorbed in the fluid can be led to the gas valve 2010 to leave the tank 2002.

Figure 16:
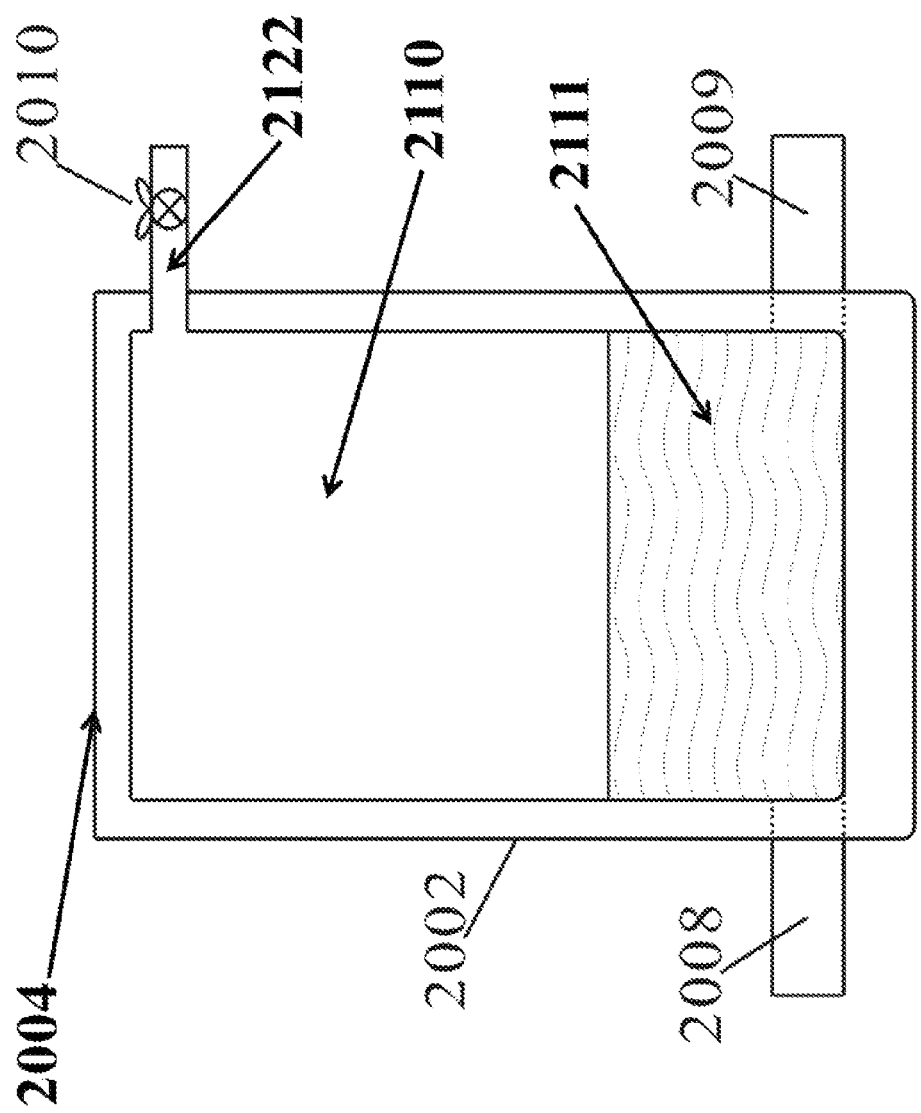
FIG. 16 shows another energy storage used in the present invention.

Please refer to FIG. 16 that shows a fluid tank 2002 used in some embodiments of the present invention. The fluid tank 2002 comprises a gas region 2110, a gas region tube 2122, a fluid region 2111, and a tank cap 2004. The gas region tube 2122 comprises a gas valve 2010. The gas region tube 2122 is also attached to the gas region 2110.

It should be noted that, for some embodiments, as shown in FIG. 16, the pressure in the gas region 2110 is kept constant through injecting gas into the tank 2002 via the gas valve 2010. Then, the fluid that flows into the fluid region 2111 will impose more pressure on the gas in the gas region 2110 so as to store more internal energy inside the gas.

The operation of an energy storage used in the present invention is described as follows. Please refer to both FIG. 15.

The piston member 1511 moves up and down through the first ball region 2006 and second ball region 2611. The gas region tube 2122 is used for adjusting the fluid tank 2002 pressure through the gas valve 2010. For some embodiments, the gas valve 2010, as shown in FIG. 15, is used for letting the gas absorbed in the fluid emit from the fluid and leave the fluid tank 2002, but not used for injecting gas into the fluid tank 2002 to result in a higher pressure. If a higher pressure is required, gas can be input into the fluid tank 2002 through the gas valve 2010. If the fluid tank pressure is too high, the gas inside the tank 2002 can be released through the gas valve 2010.

Please refer to FIG. 15. When the fluid coming from the first pipeline enters the fluid tank 2002 through the fluid input 2008, the fluid inside the fluid region 2111 will push the piston member 1511 up. As a result, a form of potential energy is stored in the piston member 1511. Next, when the fluid inside the fluid region 2111 leaves through the fluid output 2009, the potential energy stored can be poured into the fluid again through the work done by the piston member 1511 on the fluid.

For some embodiments, where a spring member 2007 is used, the spring member 2007 is stick to the head member 2003, as shown in FIG. 15. When the fluid enters the fluid tank 2002 through the fluid input 2008, a form of elastic energy will be stored in the spring member 2007, because the spring member 2007 is expended. When the fluid leaves the tank 2002 through the fluid output 2009, the elastic energy can be poured into the fluid again because the spring member 2007 will return to its normal length.

For some embodiments, as shown in FIG. 16, the present invention uses an energy storage without the piston member. The operation of such the energy storage is described as follows. First, a predetermined amount of gas is input into the fluid tank 2002 through the gas region tube 2122. Then, the gas region 2110 of the tank 2002 has a stable pressure and volume. Second, the fluid coming from the first pipeline enters the tank 2002 through the fluid input 2008. Then, the volume of the fluid region 2111 will increase. As a result, the volume of the gas region 2110 will decrease, so that the gas pressure of the gas region 2110 will increase. That is, a form of potential energy will be stored in the gas region 2110. Third, when the fluid inside the fluid region 2111 leaves the tank 2002 through the fluid output 2009. The stored, potential energy will be poured into the fluid because the gas will do work on the fluid.

For the operation of all kinds of energy storage used in the embodiments of the present invention, when the fluid is leaving the tank 2002 through the fluid output 2009, the leaving fluid will have more stable energy so as to force an fluid machinery 731, 732, 733 to generate energy. For some embodiments, the energy provided by the car movement will be accumulated in the energy storage, and when the accumulation reaches a certain amount, the overall amount energy is then provided for driving fluid machineries.

Figure 10:
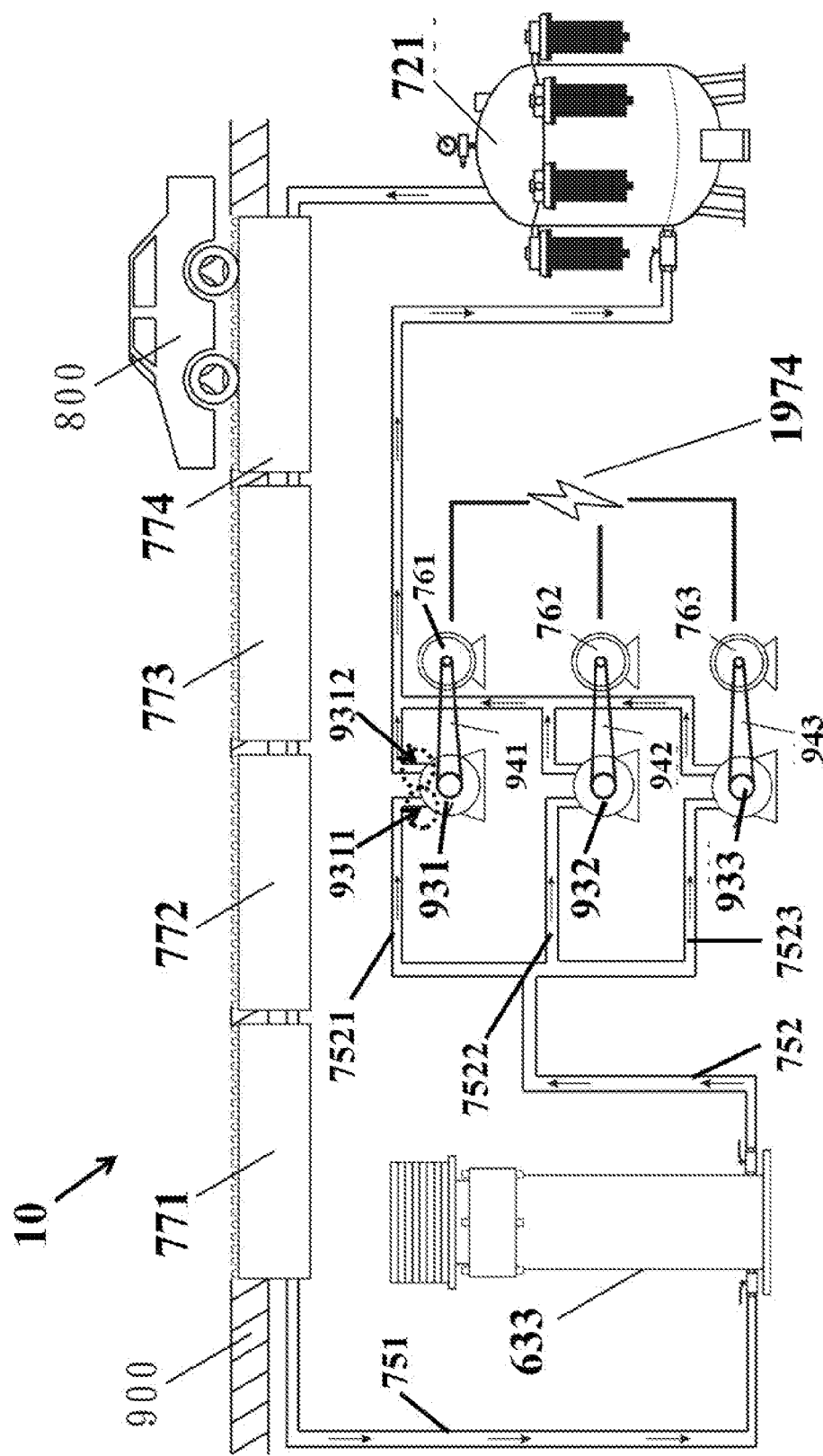
FIG. 10 shows one embodiment of an energy generating system of the present invention.
Figure 11:
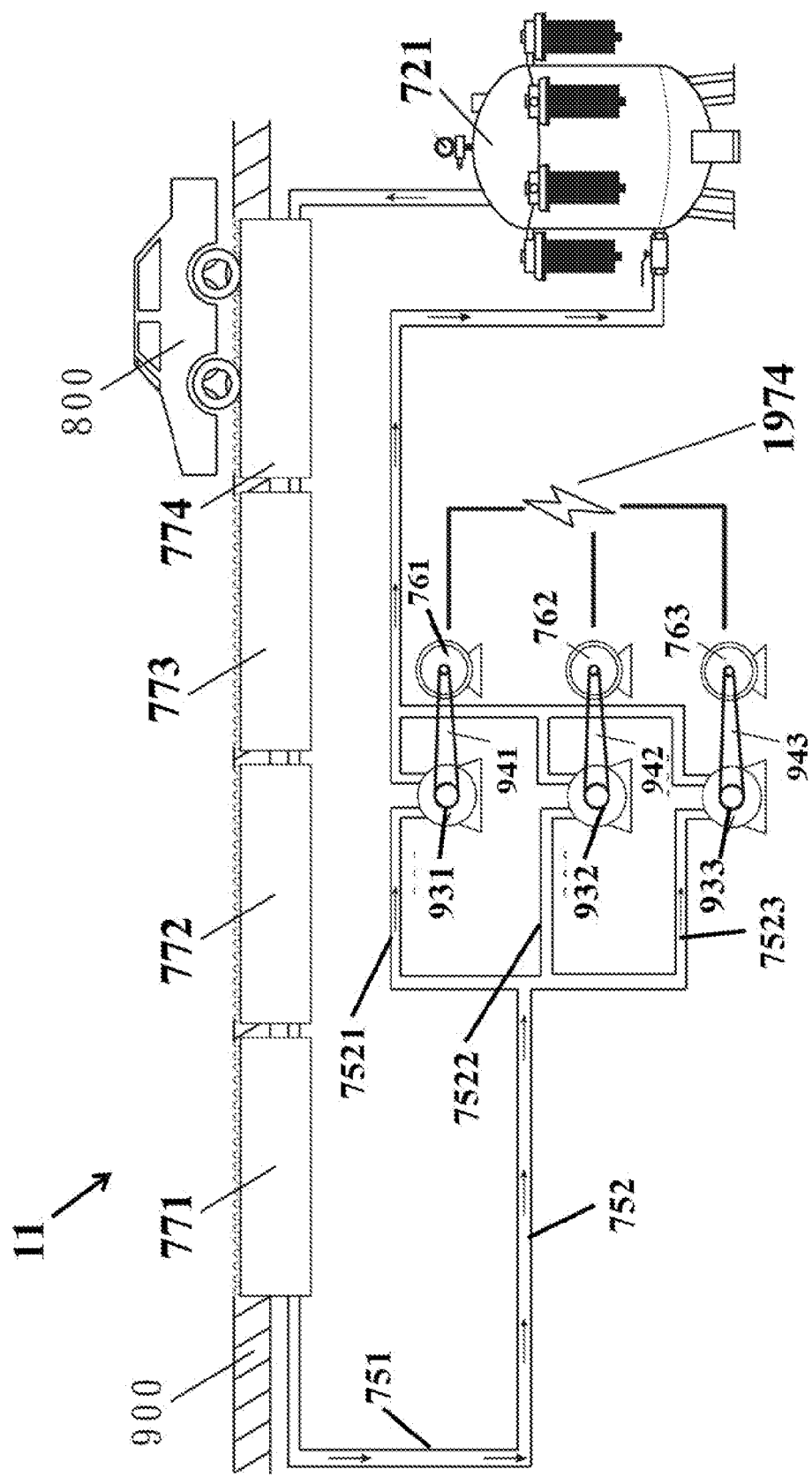
FIG. 11 shows one embodiment of an energy generating system of the present invention.

Please refer to FIGS. 10 and 11. The present invention provides alternative practices of an energy generating system. The energy generating system 10, 11 comprises a different energy transformer that has a fluid machinery 931, 932, 933, an electrical power generator 761, 762, 763, and a mechanism 941, 942, 943. The fluid machinery 931, 932, 933 transfers energy to the electrical power generator 761, 762, 763 through the mechanism 941, 942, 943. Please refer to FIG. 10. The fluid machinery 931 comprises a fluid inlet 9311 and a fluid outlet 9312. It should be mentioned that in FIGS. 10, 11, the fluid machineries 931, 932, 933 also have a fluid inlet and a fluid outlet.

The energy transformers used in FIGS. 7-9 have a fluid machinery which is a fluid cylinder. The energy transformers used in FIGS. 10 and 11 have a fluid machinery which is a fluid motor.

For some embodiments, the applied fluid machinery is a fluid cylinder. For some embodiments, the applied fluid machinery is a fluid motor.

The present invention also provides a variety of choices regarding mechanism used in the energy transformers of the present invention.

Figure 17C:
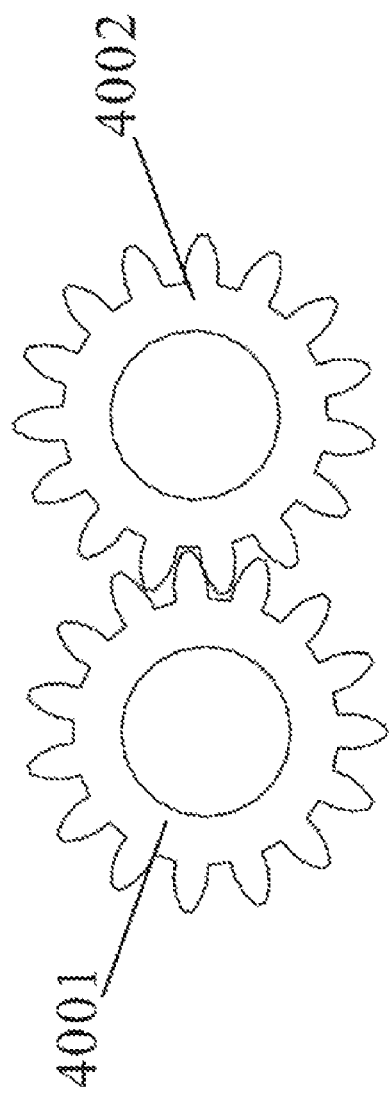
FIG. 17 shows several mechanisms used in some energy transformers of the present invention.
Figure 17D:
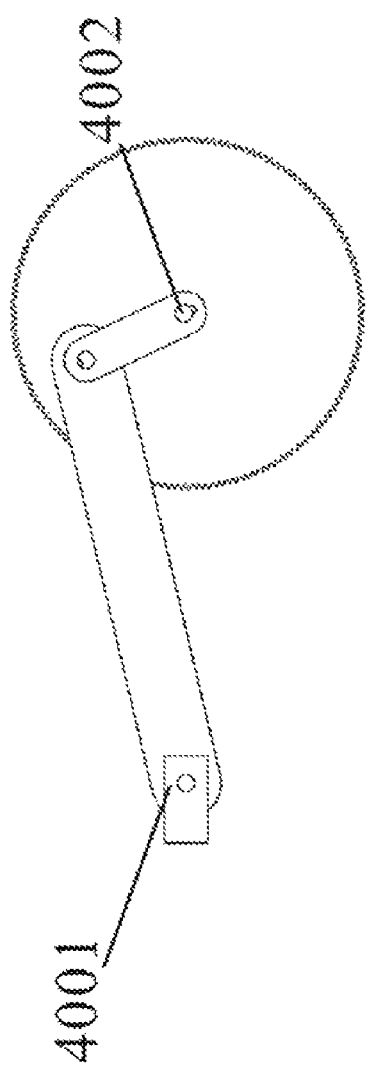
Figure 17E:
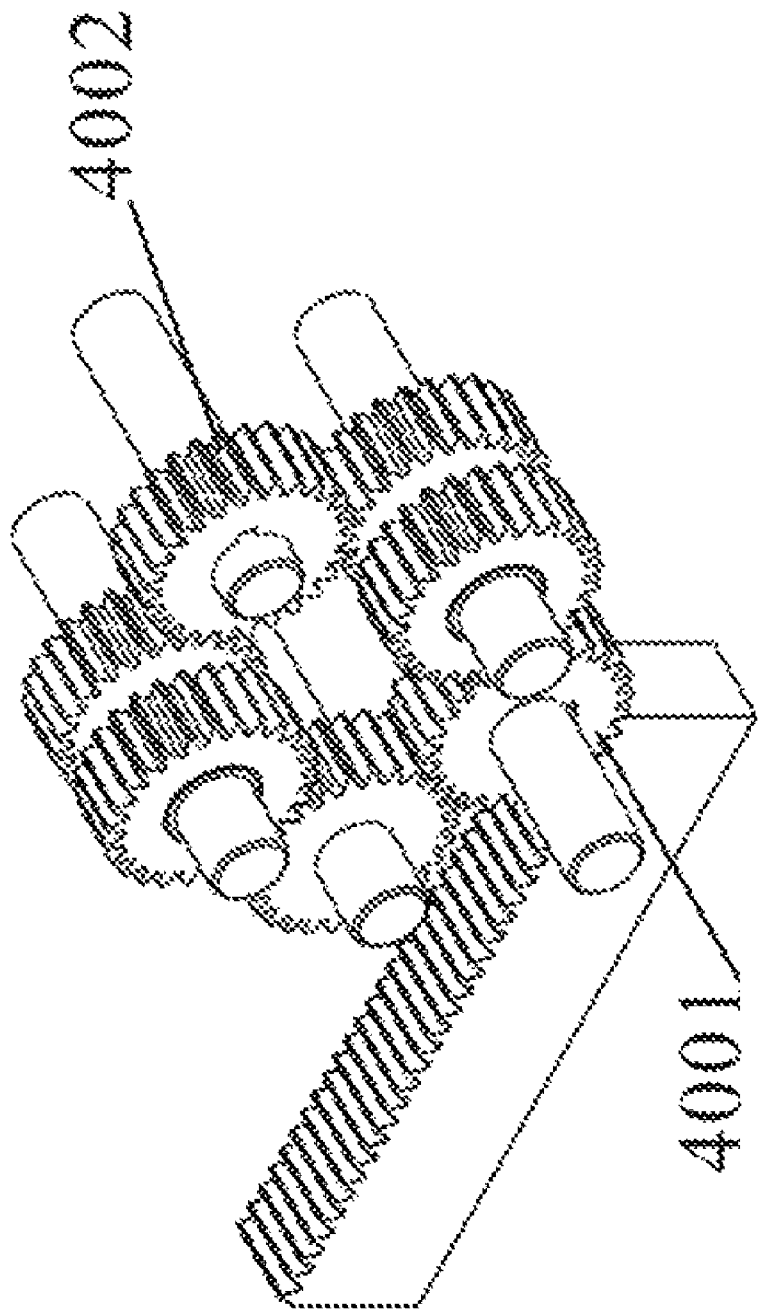

As shown in FIG. 17(*a*), for some embodiments, the mechanism is a belt drive. As shown in FIG. 17(*b*), for some embodiments, the mechanism is a chain drive. As shown in FIG. 17(*c*), for some embodiments, the mechanism is a gear drive. As shown in FIG. 17(*d*), for some embodiments, the mechanism is a crank mechanism. As shown in FIG. 17(*e*), for some embodiments, the mechanism is a rack and pinion.

The operation of an energy generating system of the present invention is described as follows.

Please refer to FIGS. 7, 9, 10 and 11. A vehicle 800 enters an area where there are several object holders 771, 772, 773, 774. Please refer to FIG. 12, the vehicle 800 is moving in one direction 8001. The weight of the vehicle 800 then is a force applied onto several pressure-transferring devices 1007, 1001. It should be noted that, for some embodiments, the car 800 moving direction is perpendicular to the movement of the pressure-transferring devices.

Please refer to FIG. 13, when the pressure-transferring device 1007 receives the weight force provided by the vehicle 800, the force will be transferred from the contact member 1311 to the pushing member 1313, 1049. Consequently, the pushing member 1049 will press the fluid tube 1019. Then, the fluid inside the fluid tube 1019 will leave the tube 1019 through the outlet non-return valve 1003.

Please refer to FIG. 13 again. When the weight force is removed from the pressure-transferring device 1007 (e.g., the vehicle 800 has passed the object holder), there is no force applied onto the contact member 1311. Then, the pushing member 1049 will return to its original state. Because the part 1049 of the pushing member covering the fluid tube 1019 is made of elastic materials, the part 1049 will return to its original shape. So, the pushing member will move up. The contact member 1311 then will return to its original level. Meanwhile, the fluid in the energy generating system will enter the fluid tube 1019 through the inlet non-return valve 1002.

It should be noted that, for some embodiments, after the contact member 1311 is pressed, the fluid stored in the fluid storage 721 can be used for moving the contact member 1311 back to its original level. For some embodiments, a spring member can be used for doing so. Such the spring member can be inserted into the pressure-transferring device to perform such function.

For some embodiments, after the contact member 1311 is pressed, the fluid stored in the fluid storage 721 is then pressurized to be used for moving the contact member 1311 back to its original level. For some embodiments, a spring member could be incorporated with the pushing member 1313 to perform the function of moving the contact member 1311 back to its original level.

Figure 14:
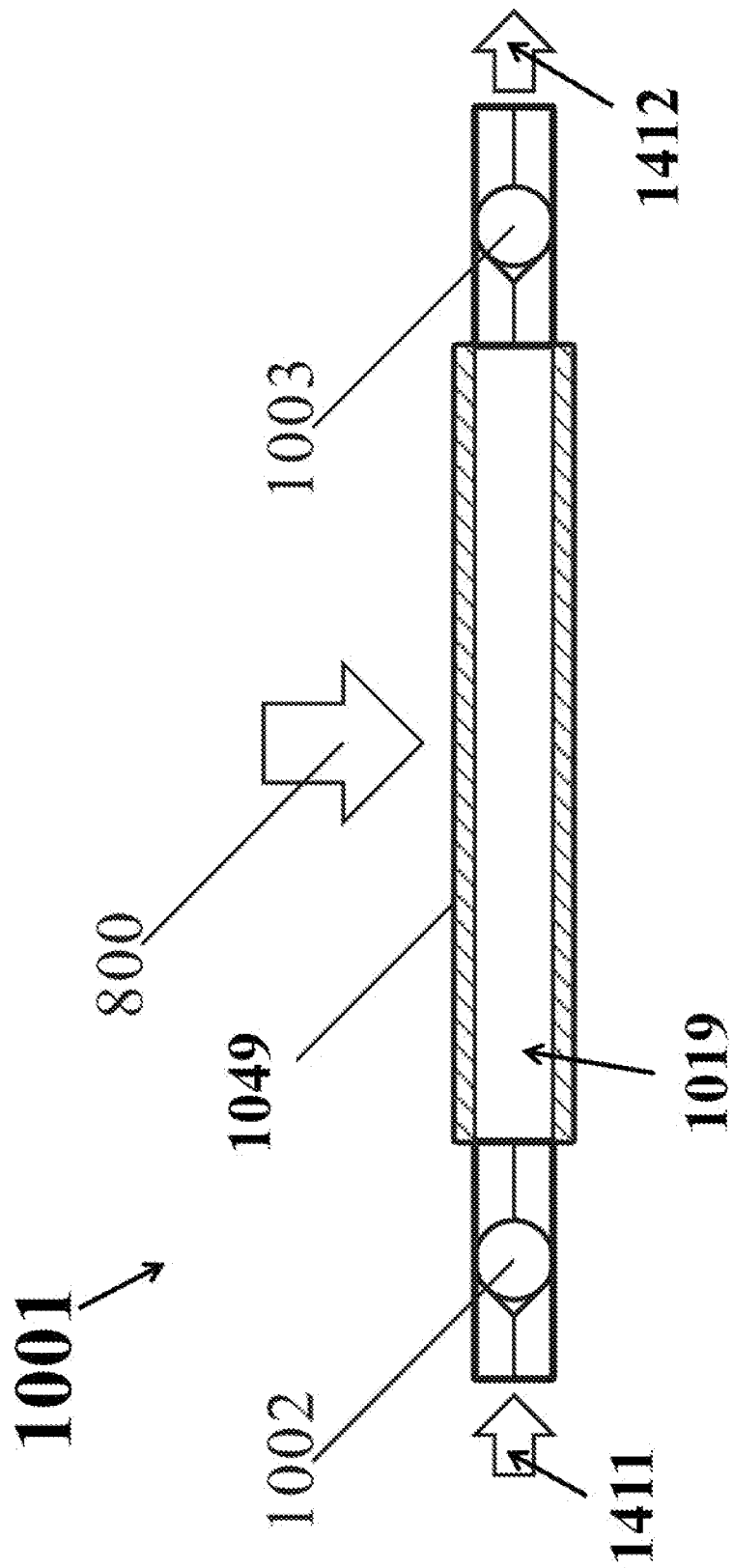
FIG. 14 shows one pressure-transferring device used in the present invention.

Alternatively, when a pressure-transferring device 1001 shown in FIG. 14 is applied, the weight force provided by the vehicle 800 will be directly applied onto the pushing member 1049 that covers the fluid tube 1019. After the vehicle 800 passes the object holder, because of the elastic characteristics of the pushing member 1049, the pushing member 1049 will return to its original shape. By doing so, the fluid will leave the fluid tube 1019 through the outlet non-return valve 1003 and then enter the fluid tube 1019 through the inlet non-return valve 1002.

It should be noted that, for some embodiments, after the pushing member 1049 is pressed, the fluid stored in the fluid storage 721 can be used for moving the pushing member 1049 back to its original level. For some embodiments, a spring member can be used for doing so.

For some embodiments, after the pushing member 1049 is pressed, the fluid stored in the fluid storage 721 can be pressurized to be used for moving the pushing member 1049 back to its original level. For some embodiments, the elastic material 1049 of the pushing member 1049 could be functioning to move the pushing member 1049 back to its original level.

After the fluid leaves the object holders, as shown in FIGS. 7 and 10, the fluid will enter the energy storage 633. The energy storage 633 may provide additional energy to the fluid. Then, when the fluid leaves the energy storage 633, it may have more stable power to run the fluid machinery.

It should be noted that, for some embodiments, the energy storage 633 is used for accumulating the energy input from the pressure-transferring devices and, then, providing the stable energy to the fluid machineries.

Alternatively, as shown in FIGS. 9 and 11, when the energy storage is not used, the fluid will directly enter the fluid machinery to run it.

Please refer to FIGS. 7, 9, 10 and 11 again. The fluid enters the fluid machinery 731, 732, 733, 931, 932, 933 to use hydraulic force to produce mechanical power. Then, the fluid will leave the fluid machinery.

Next, the fluid will enter the fluid storage 721. Then, the fluid will leave the fluid storage 721 to begin a new cycle of the operation. For some embodiments, during the operation, the pressure in the fluid storage 721 will first maintain constant, and then force the reflux to flow to the object holders 771, 772, 773, 774.

The present invention also provides more details about the operation of the energy transformer 78. When the fluid machinery is driven to create mechanical power, the mechanical power will run the mechanism 741, 742, 742, 941, 942, 943 as shown in FIGS. 7, 9, 10 and 11. Then, the mechanism will begin to drive the electrical power generator to generate electricity.

It should be noted that, for some embodiments, the device 78 comprises a fluid actuator and a power transmission. The fluid actuator may be a hydraulic cylinder or hydraulic motor. The power transmissions are shown in FIG. 17.

The electricity from the electrical power generators 761, 762, 763 will be transferred in the power lines that are set in parallel. The electricity is transferred to the power converter 1974. As a result, the energy generating system can begin to provide electricity.

It should be noted that, for some embodiments, the power converter 1974 can provide the electricity generated to the general public in terms of parallel circuits. Alternatively, the generated electricity may be stored in a battery.

It is apparent to a person skilled in the art that the basic idea of the invention can be implemented in many different ways. The invention and its embodiments are thus not restricted to the examples described above, but may vary with the scope of the appended claims.

What is claimed is:

1. An energy generating system, comprising:
    at least one object holder, wherein the object holder comprises at least one pressure-transferring device, wherein the pressure-transferring device at least comprises a fluid tube, an outlet non-return valve, and an inlet non-return valve, wherein the outlet non-return valve and inlet non-return valve are disposed in the fluid tube;
    at least one energy transformer, wherein the energy transformer comprises a fluid machinery, an electrical power generator, and a mechanism, wherein the fluid machinery transfers energy to the electrical power generator through the mechanism, wherein the fluid machinery comprises a fluid inlet and a fluid outlet;
    at least one fluid storage;
    at least one power converter electrically connected to the electrical power generator;
    at least one first pipeline connected to the fluid tube of the pressure-transferring device and connected to the fluid inlet of the fluid machinery;
    at least one second pipeline connected to the fluid outlet of the fluid machinery and connected to the fluid storage;
    at least one third pipeline connected to the fluid storage and connected to the fluid tube of the pressure-transferring device; and
    at least one energy storage disposed between the object holder and the fluid machinery; wherein the energy storage has a fluid input and a fluid output; wherein the fluid input of the energy storage is connected to the first pipeline, and the fluid output of the energy storage is connected to the first pipeline,
    wherein the energy storage comprises:
    at least one fluid tank, wherein the fluid tank comprises a gas region, a gas region tube, a fluid region, and a tank cap, wherein the gas region tube comprises a gas valve and is attached to the gas region, wherein the tank cap comprises a cap opening and a first ball region, wherein the cap opening comprises an inner sidewall, wherein the first ball region comprises a plurality of first balls, wherein the first ball region is attached to the cap opening;
    at least one piston member, wherein a piston member comprises a top member, a piston body member and a head member, wherein the top member is disposed above the tank cap, wherein the piston body member penetrates through the cap opening, wherein the head member comprises a second ball region and a head body, wherein the second ball region comprises a plurality of second balls, wherein the head body comprises an outer sidewall and at least one tunnel, wherein the second ball region is attached to the outer sidewall, wherein a portion of the piston member is disposed in the fluid tank; and
    at least one spring member, wherein the spring member is attached to the piston member, wherein the spring member is disposed in the fluid tank;
    wherein the fluid input and fluid output are attached to the fluid region.

2. An energy generating system as claimed in claim 1, wherein the object holder further comprises a cast, wherein the pressure-transferring device is exposed on a top surface of the cast.

3. An energy generating system as claimed in claim 1, wherein the fluid machinery is a fluid cylinder.

4. An energy generating system as claimed in claim 1, wherein the fluid machinery is a fluid motor.

5. An energy generating system as claimed in claim 1, wherein the mechanism is a belt drive.

6. An energy generating system as claimed in claim 1, wherein the mechanism is a chain drive.

7. An energy generating system as claimed in claim 1, wherein the mechanism is a gear drive.

8. An energy generating system as claimed in claim 1, wherein the mechanism is a crank mechanism.

9. An energy generating system as claimed in claim 1, wherein the mechanism is a rack and pinion.

10. An energy generating system, comprising:
- at least one object holder, wherein the object holder comprises at least one pressure-transferring device, wherein the pressure-transferring device at least comprises a fluid tube, an outlet non-return valve, and an inlet non-return valve, wherein the outlet non-return valve and inlet non-return valve are disposed in the fluid tube;
- at least one energy transformer, wherein the energy transformer comprises a fluid machinery, an electrical power generator, and a mechanism, wherein the fluid machinery transfers energy to the electrical power generator through the mechanism, wherein the fluid machinery comprises a fluid inlet and a fluid outlet;
- at least one fluid storage;
- at least one power converter electrically connected to the electrical power generator;
- at least one first pipeline connected to the fluid tube of the pressure-transferring device and connected to the fluid inlet of the fluid machinery;
- at least one second pipeline connected to the fluid outlet of the fluid machinery and connected to the fluid storage; and
- at least one third pipeline connected to the fluid storage and connected to the fluid tube of the pressure-transferring device,
- wherein the pressure-transferring device further comprises a contact member, a chamber member, and a pushing member, wherein the pushing member is connected to the contact member and the fluid tube, wherein the pushing member is disposed in the chamber member, and
- wherein the contact member comprises a tunnel and a gas outlet member, wherein the gas outlet member is disposed in the tunnel.

11. An energy generating system as claimed in claim 10, wherein the chamber member comprises a main body, a chamber, and a cap; wherein the pushing member is disposed in the chamber; wherein the cap comprises a hole, and the contact member extends to a region that is above the hole.

12. An energy generating system as claimed in claim 11, wherein the chamber is vacuum.

* * * * *